United States Patent
Seok

(10) Patent No.: US 9,894,652 B2
(45) Date of Patent: Feb. 13, 2018

(54) METHOD AND APPARATUS FOR CHANNEL ACCESS IN WIRELESS LAN SYSTEM

(71) Applicant: LG Electronics Inc., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 14/833,646

(22) Filed: Aug. 24, 2015

(65) Prior Publication Data

US 2015/0365943 A1    Dec. 17, 2015

Related U.S. Application Data

(63) Continuation of application No. 14/042,091, filed on Sep. 30, 2013, now Pat. No. 9,144,088.

(60) Provisional application No. 61/715,310, filed on Oct. 18, 2012, provisional application No. 61/717,115, filed on Oct. 23, 2012, provisional application No. 61/721,029, filed on Nov. 1, 2012.

(51) Int. Cl.

| | |
|---|---|
| H04W 72/04 | (2009.01) |
| H04W 74/00 | (2009.01) |
| H04W 74/04 | (2009.01) |
| H04W 4/00 | (2009.01) |
| H04W 74/08 | (2009.01) |
| H04W 84/12 | (2009.01) |

(52) U.S. Cl.
CPC ....... *H04W 72/0446* (2013.01); *H04W 4/005* (2013.01); *H04W 74/00* (2013.01); *H04W 74/04* (2013.01); *H04W 74/0816* (2013.01); *H04W 84/12* (2013.01)

(58) Field of Classification Search
CPC . H04W 84/12; H04W 28/26; H04W 72/1278; H04W 74/002; Y02B 60/50
See application file for complete search history.

(56) References Cited

U.S. PATENT DOCUMENTS

| | | | |
|---|---|---|---|
| 7,161,951 B1 | 1/2007 | Sherman | |
| 7,864,796 B1 | 1/2011 | Benveniste | |
| 8,223,639 B2 | 7/2012 | Seok | |
| 8,270,385 B2 | 9/2012 | Wentink | |
| 8,488,550 B2 | 7/2013 | Wentink | 370/329 |
| 8,619,808 B2 * | 12/2013 | Chu | H04W 74/08 370/328 |
| 2006/0045048 A1 | 3/2006 | Kwon et al. | |
| 2007/0115882 A1 | 5/2007 | Wentink | |

(Continued)

FOREIGN PATENT DOCUMENTS

| | | |
|---|---|---|
| CN | 1996908 A | 7/2007 |
| CN | 101300804 A | 11/2008 |

(Continued)

*Primary Examiner* — Chandrahas B Patel
(74) *Attorney, Agent, or Firm* — Dentons US LLP

(57) ABSTRACT

A method and apparatus for performing channel access in a WLAN system are disclosed. A method for managing a network allocation vector (NAV) by a station (STA) in a wireless LAN (WLAN) system includes: receiving a Contention Free (CF)-END frame including a duration field; if the CF-END frame is a first-type CF-END frame, resetting the NAV; and if the CF-END frame is a second-type CF-END frame, determining whether to reset the NAV according to a comparison result between a value of the duration field and a NAV value of the STA.

5 Claims, 19 Drawing Sheets

(56) References Cited

U.S. PATENT DOCUMENTS

| | | |
|---|---|---|
| 2008/0013496 A1 | 1/2008 | Dalmases et al. |
| 2009/0187661 A1 | 7/2009 | Sherman |
| 2010/0135268 A1 | 6/2010 | Seok |

FOREIGN PATENT DOCUMENTS

| | | |
|---|---|---|
| CN | 101401334 A | 4/2009 |
| EP | 2369894 A1 | 9/2011 |
| JP | 2004-535695 | 11/2004 |
| JP | 2009-522910 A | 6/2009 |
| JP | 2011-172283 A | 9/2011 |
| RU | 2407187 C2 | 12/2010 |
| RU | 2413370 C2 | 2/2011 |
| WO | 02071650 A1 | 9/2002 |
| WO | 2006025680 A1 | 3/2006 |
| WO | 2007078073 A1 | 7/2007 |
| WO | 2007127311 A2 | 11/2007 |

\* cited by examiner

FIG. 17

| Element ID | Length | GID | Restricted Access Window Start Offset | Restricted Access Window Duration |
|---|---|---|---|---|

Octet: 1　　1　　1　　　　4　　　　　　　　4

METHOD AND APPARATUS FOR CHANNEL ACCESS IN WIRELESS LAN SYSTEM

This application is a Continuation of U.S. application Ser. No. 14/042,091 filed Sep. 30, 2013, which claims the benefit of U.S. provisional application No. 61/715,310, filed on Oct. 18, 2012, U.S. provisional application No. 61/717,115, filed on Oct. 23, 2012, and U.S. provisional application No. 61/721,029, filed on Nov. 1, 2012, which are hereby incorporated by reference as if fully set forth herein.

BACKGROUND OF THE INVENTION

Field of the Invention

The present invention relates to a wireless communication system, and more particularly to a method and apparatus for channel access in a wireless LAN (WLAN) system.

Discussion of the Related Art

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

SUMMARY OF THE INVENTION

Accordingly, the present invention is directed to a method and apparatus for transmitting and receiving a frame including a partial association identifier (PAID) in a WLAN system that substantially obviate one or more problems due to limitations and disadvantages of the related art. Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

An object of the present invention is to provide a new method for efficiently managing a network allocation vector (NAV) so as to increase the efficiency of channel access.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for managing a network allocation vector (NAV) by a station (STA) in a wireless LAN (WLAN) system includes: receiving a Contention Free (CF)-END frame including a duration field; if the CF-END frame is a first-type CF-END frame, resetting the NAV; and if the CF-END frame is a second-type CF-END frame, determining whether to reset the NAV according to a comparison result between a value of the duration field and a NAV value of the STA.

In another aspect of the present invention, a station (STA) for managing a network allocation vector (NAV) in a wireless LAN (WLAN) system includes: a transceiver; and a processor, wherein the processor receives a Contention Free (CF)-END frame including a duration field through the transceiver; if the CF-END frame is a first-type CF-END frame, resets the NAV; and if the CF-END frame is a second-type CF-END frame, determines whether to reset the NAV according to a comparison result between a value of the duration field and a NAV value of the STA.

The following description may be commonly applied to the embodiments of the present invention.

The duration field of the first-type CF-END frame may be set to zero (0).

The duration field of the second-type CF-END frame may be set to a non-zero value.

If a value indicated by the duration field of the second-type CF-END frame is different from the NAV value of the STA, the STA may discard the CF-END frame.

If a value indicated by the duration field of the second-type CF-END frame is identical to the NAV value of the STA, the STA may reset the NAV.

If a value indicated by the duration field of the second-type CF-END frame is identical to the NAV value of the STA, the STA may reset the NAV and may attempt to perform channel access.

If a value indicated by the duration field of the second-type CF-END frame is different from any value of a predetermined range based on the NAV value of the STA, the STA may discard the CF-END frame.

If a value indicated by the duration field of the second-type CF-END frame is identical to any value of a predetermined range based on the NAV value of the STA, the STA may reset the NAV.

If a value indicated by the duration field of the second-type CF-END frame is identical to any value of a predetermined range based on the NAV value of the STA, the STA may reset the NAV and may attempt to perform channel access.

The value of the predetermined range may be selected from among the range from NAV value−delta to NAV value+delta, wherein the delta is a natural number.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

FIG. 17 is a conceptual diagram illustrating an exemplary format of a RAW parameter set information element (IE).

DESCRIPTION OF SPECIFIC EMBODIMENTS

Figure 1:
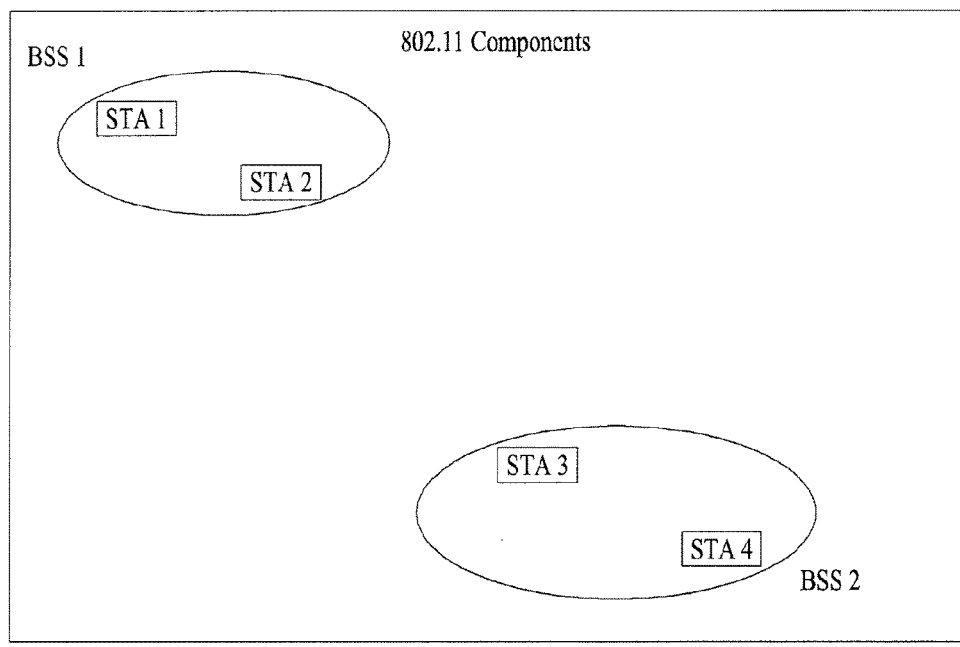
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
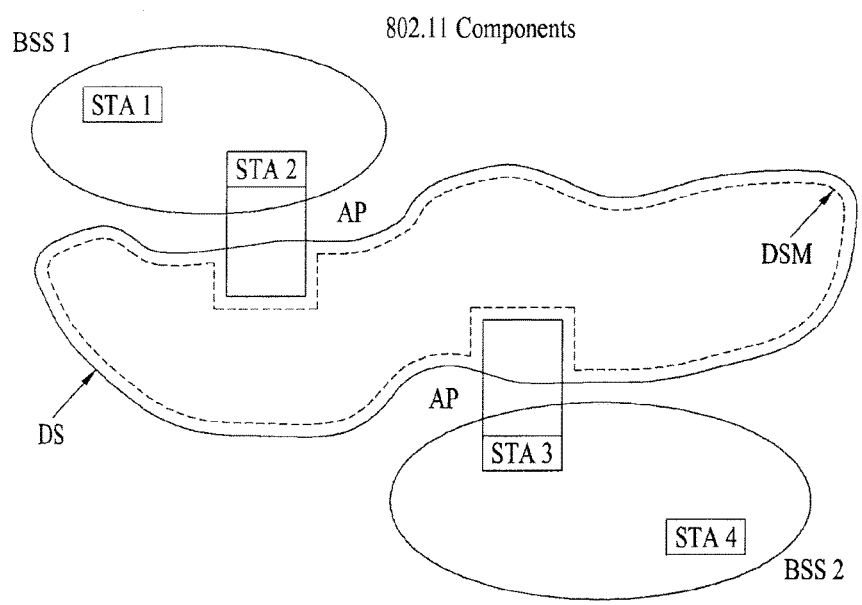
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
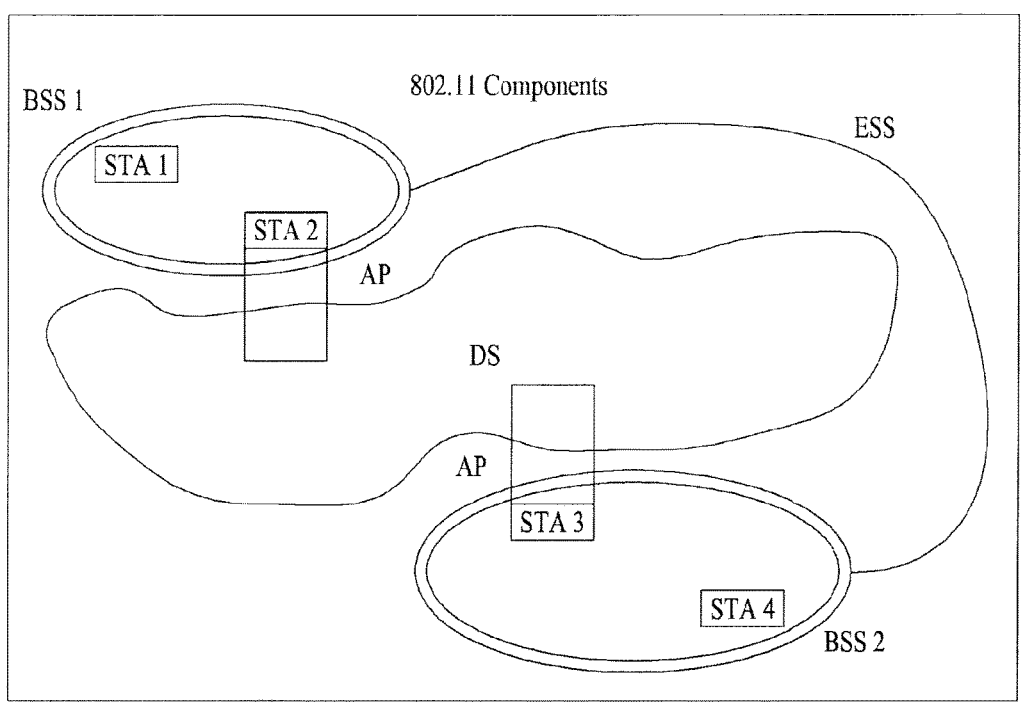
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
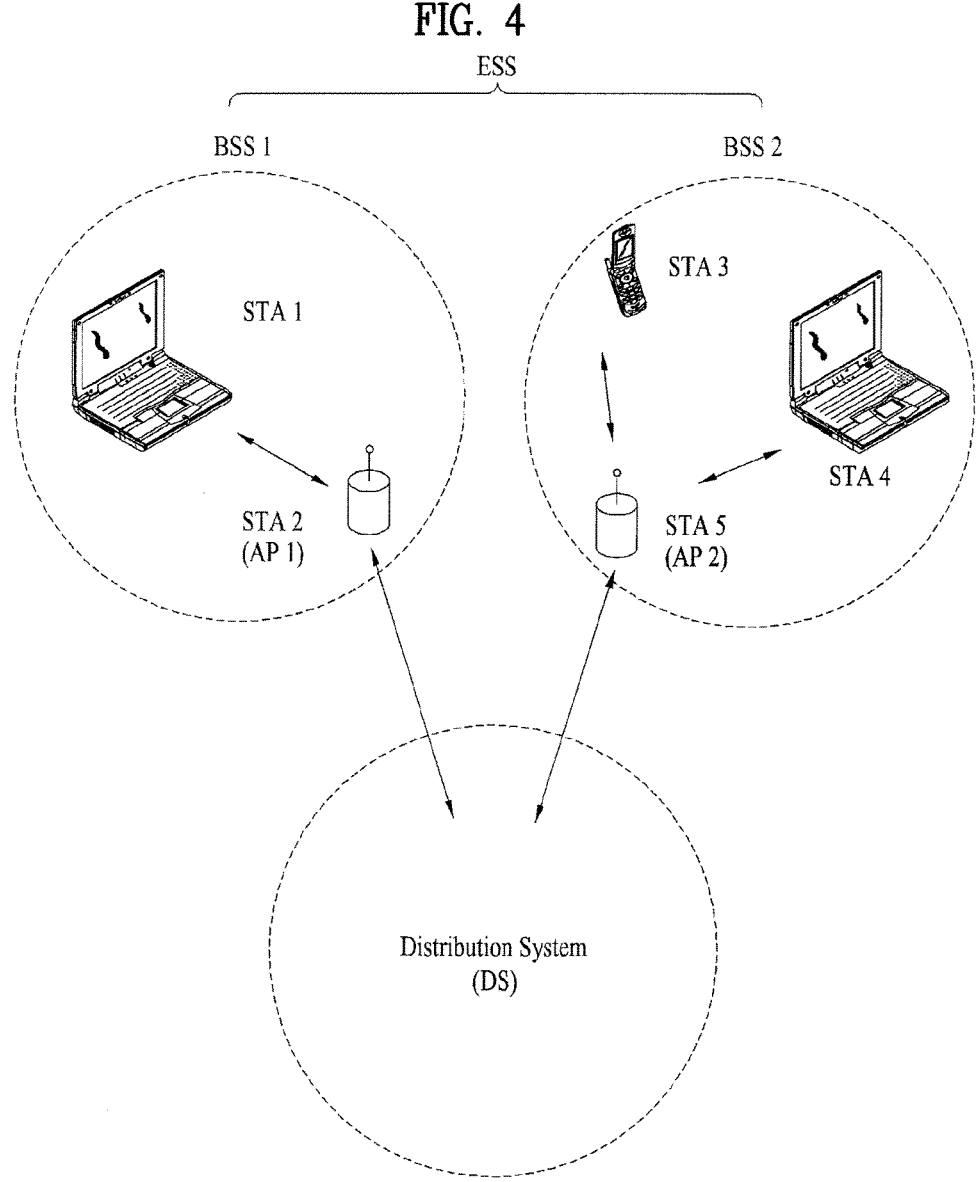
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
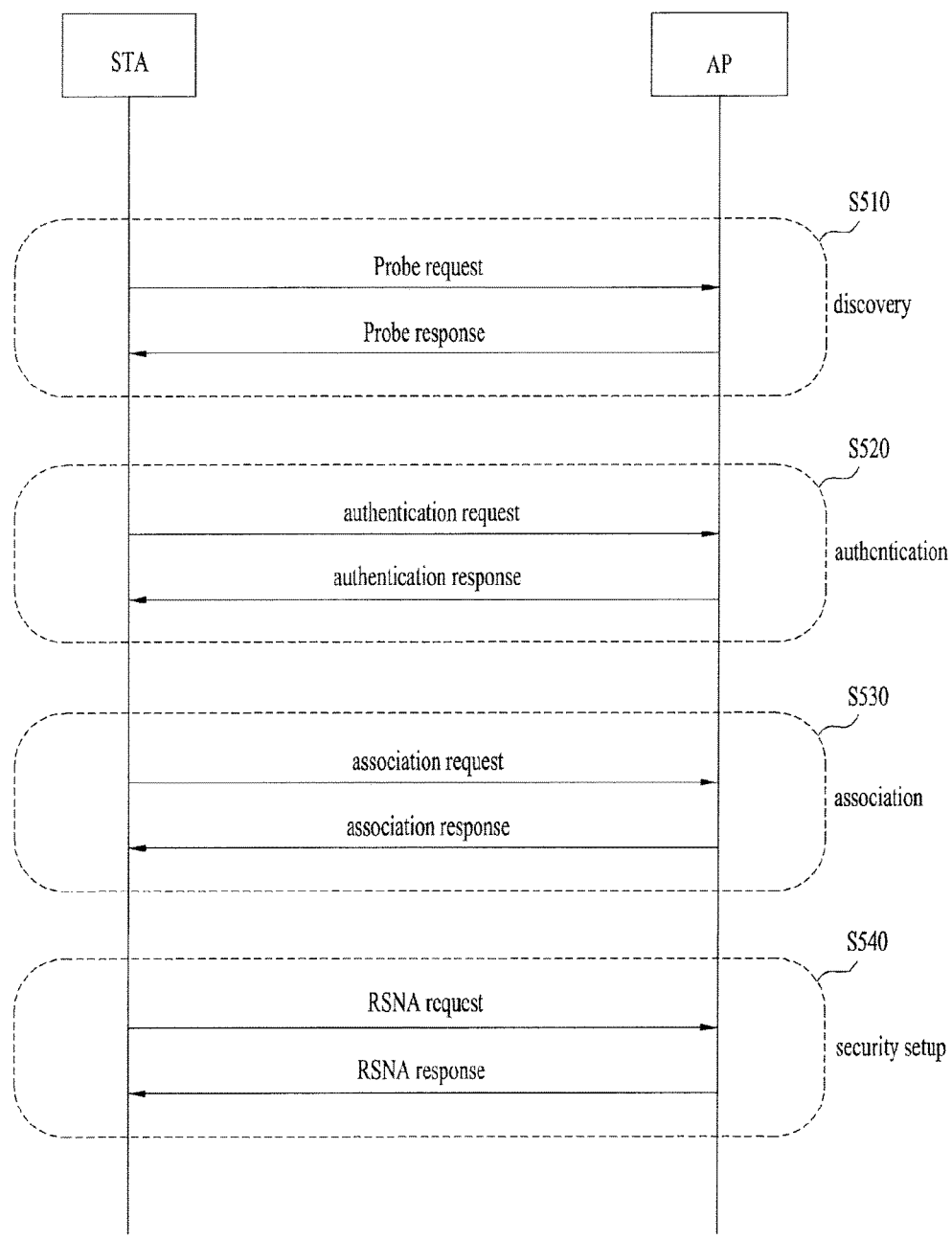
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11—based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
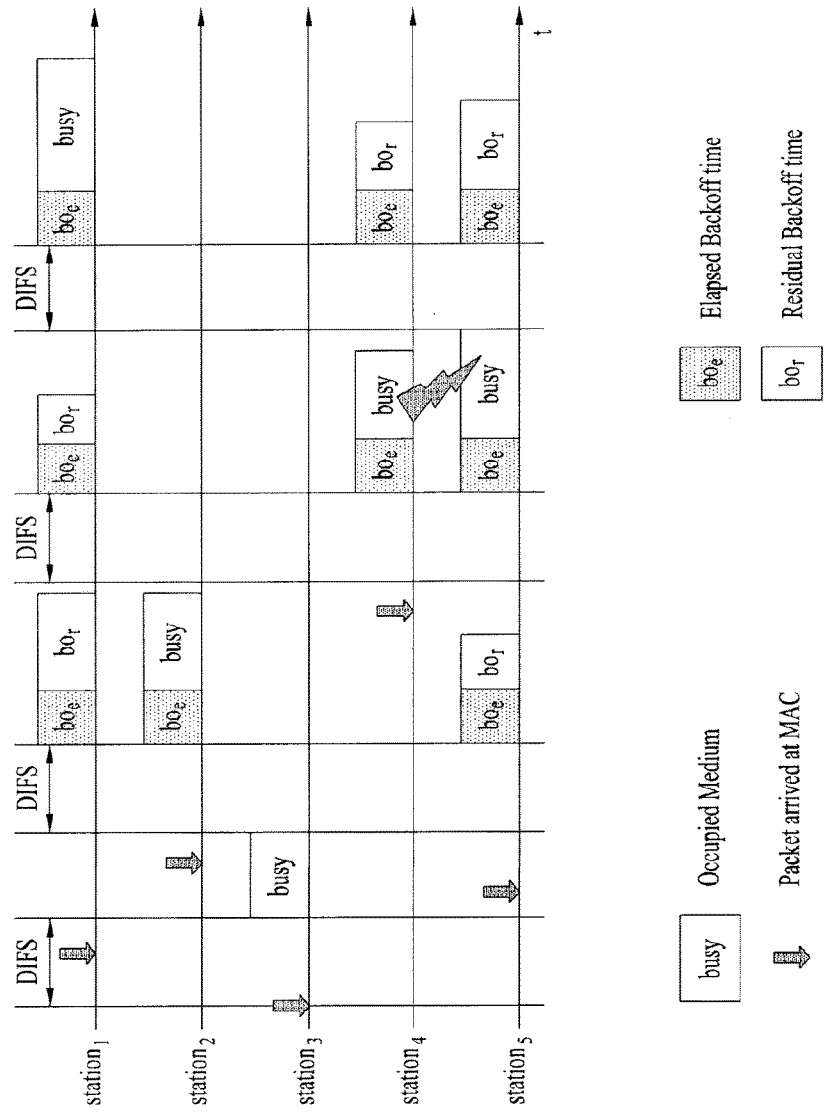
FIG. 6 is a conceptual diagram illustrating a backoff process.

FIG. 6 is a conceptual diagram illustrating a backoff process.

Operations based on a random backoff period will hereinafter be described with reference to FIG. 6. If the occupyor busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame. In addition, a value of NAV is calculated/determined as a unit of microsecond.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
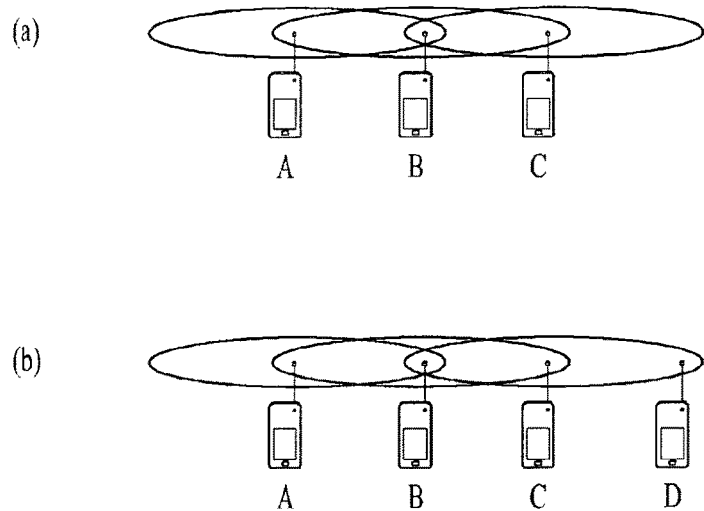
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
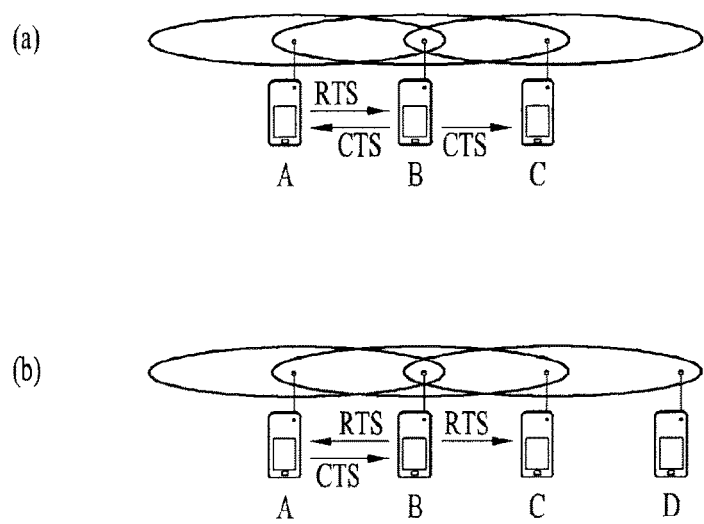
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
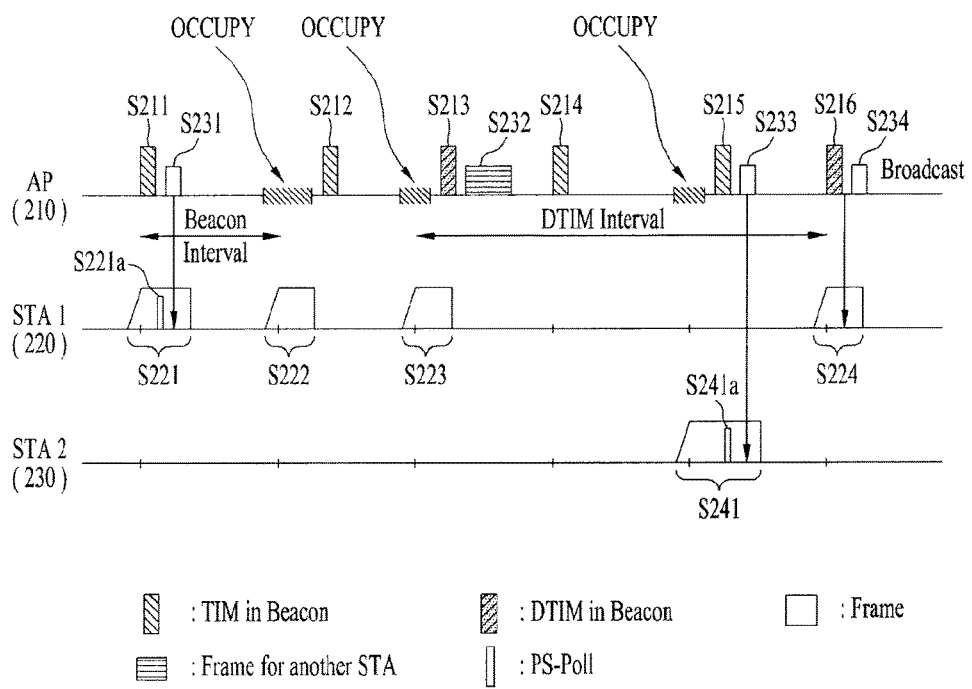
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confines the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
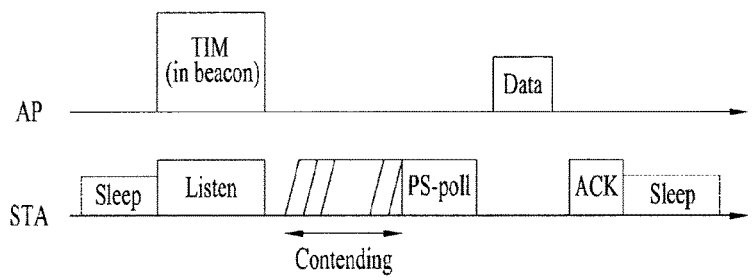
FIGS. 10 to 12 are conceptual diagrams illustrating detailed operations of a station (STA) having received a Traffic Indication Map (TIM).
Figure 11:
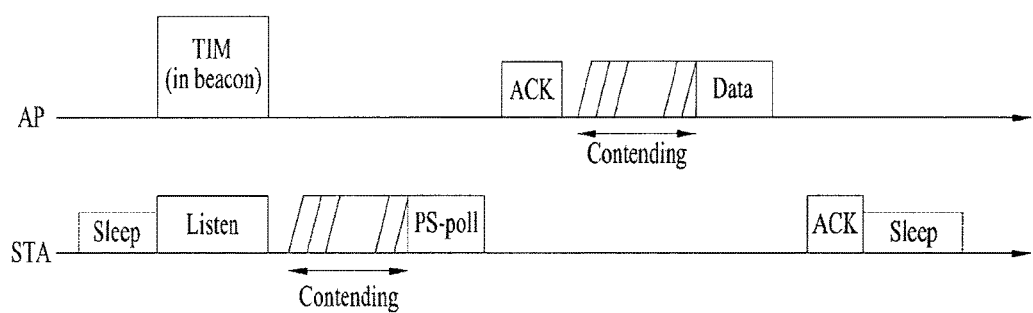
Figure 12:
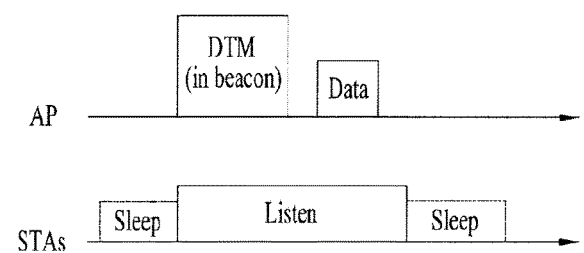

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 13:
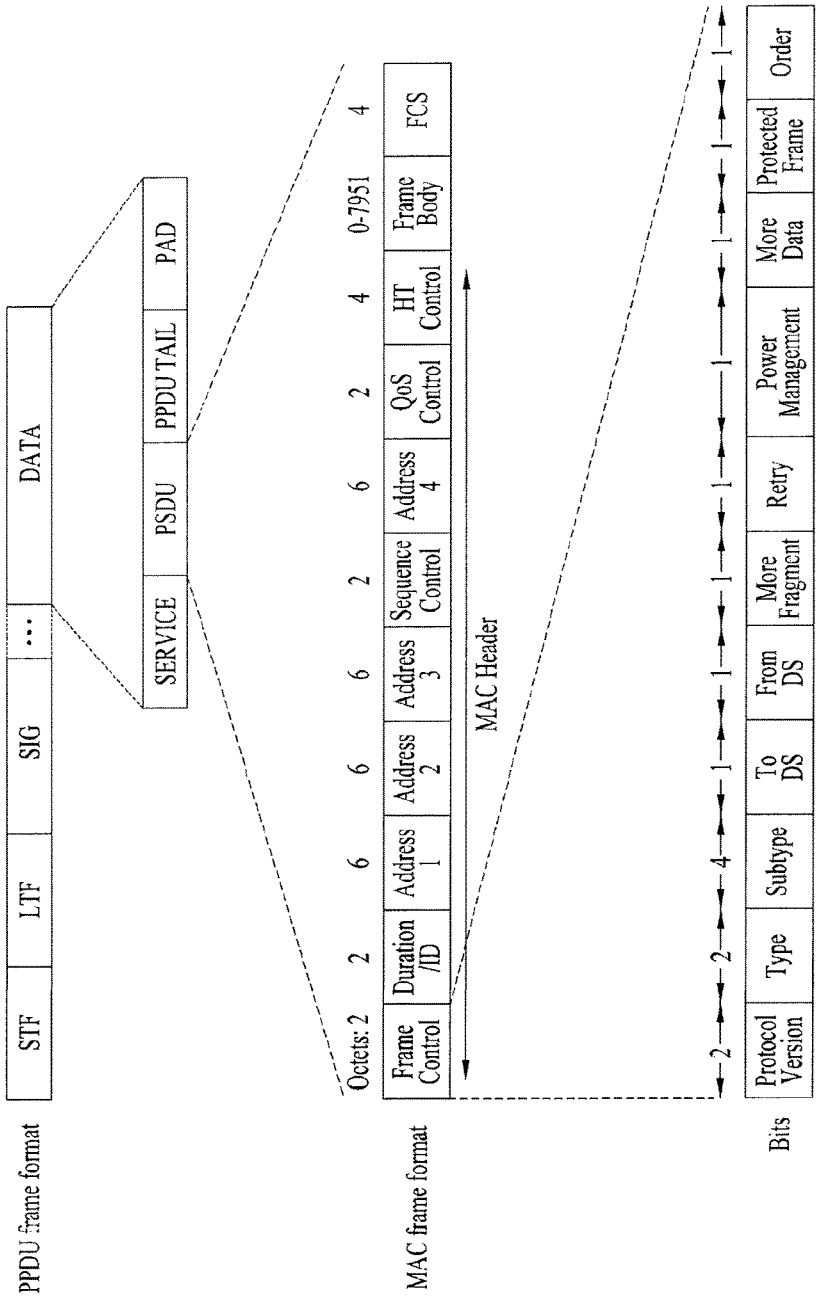
FIG. 13 is a conceptual diagram illustrating a frame structure for use in IEEE 802.11.

FIG. 13 is a diagram for explaining an exemplary frame format used in 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. A detailed description of Sequence Control, QoS Control, and HT Control sub-fields of the MAC header may refer to IEEE 802.11-2012 standard documents.

The frame control field of the MAC header may include Protocol Version, Type, Subtype, To DS, From DS, More Fragment, Retry, Power Management, More Data, Protected Frame, and Order sub-fields. A detailed description of individual sub-fields of the frame control field may refer to IEEE 802.11-2012 standard documents.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

TXOP Truncation

If the STA capable of accessing a channel can empty its own transmission sequence using an EDCA, the residual time duration is enough for frame transmission, Contention Free (CF)-END frame can be transmitted. By transmission of the CF-END frame, the corresponding STA can explicitly represent the end of a Transmission Opportunity (TXOP) thereof. In this case, TXOP is defined as a time interval for which a specific STA has a right to initiate frame exchange on a radio medium, and the time interval can be established by a start timing point and a maximum interval value.

A TXOP holder configured to transmit the CF-END frame should not initiate the additional frame exchange sequence within a current TXOP.

A non-AP STA but not the TXOP holder must not transmit the CF-END frame.

The STA having received the CF-END frame may interpret the CF-END frame as a NAV reset. That is, the corresponding STA may reset the NAV timer to zero at the end time of a data unit (for example, PPDU) including the CF-END frame.

If the AP receives the CF-END frame having a BSSID identical to a BSSID of the AP, it transmits the CF-END frame after lapse of the SIFS time so as to answer the CF-END frame.

Transmission of a single CF-END frame by the TXOP holder may reset the NAV of the STA capable of listening to transmission of the corresponding TXOP holder. Whereas STAs cannot listen to the CF-END frame causing the NAV reset, there may be other STAs capable of listening to transmission of the TXOP respondent configured to reset the NAV. (For example, the situation of a hidden node). The STAs may prevent competition in medium before expiration of original NAV reservation.

Figure 14:
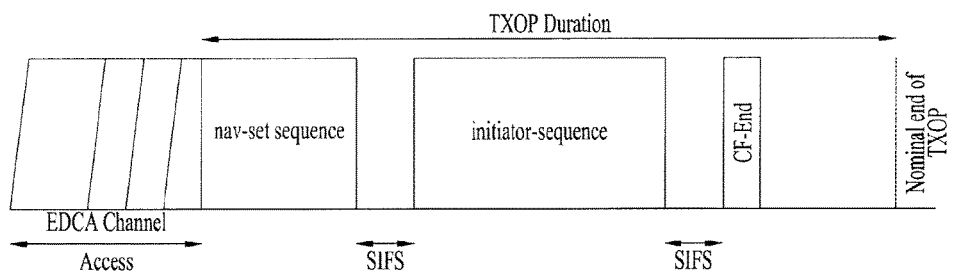
FIG. 14 is a conceptual diagram illustrating an example of TXOP truncation.

FIG. 14 is a conceptual diagram illustrating an example of TXOP truncation.

The STA can access the medium using the EDCA channel access. Thereafter, the STA can transmit the NAV setting sequence (e.g., RTS/CTS). After lapse of the SIFS time, the STA transmits the initiator sequence, so that transmission/reception of a plurality of PPDUs can be carried out between the TXOP holder and the TXOP respondent. At the end time of the PPDU transmission/reception sequence, if the TXOP holder does not have data appropriate for transmission within the corresponding TXOP, the TXOP holder STA transmits the CF-END frame so as to truncate the TXOP operation.

STAs having received the CF-END frame may reset their NAVs and can therefore initiate competition in medium without causing additional delay.

As described above, if the STA having acquired the TXOP does not have data to be transmitted any longer, the TXOP holder (or TXOP owner) may truncate the TXOP operation by broadcasting the CF-END frame. Each having received the CF-End frame may reset the NAV, and may initiate channel access (or competition in channel) after lapse of the CF-END frame.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 15(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 15(b) is a conceptual diagram illustrating a group-based AID. In FIG. 15(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 15(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel accessing is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may not be allowed. A predetermined time interval in which access to only specific STA(s) is allowed may also be referred to as a Restricted Access Window (RAW).

Channel access based on GID will hereinafter be described with reference to FIG. 15(c). If AIDs are divided into three groups, the channel access mechanism according to the beacon interval is exemplarily shown in FIG. 15(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 15(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

Figure 16:
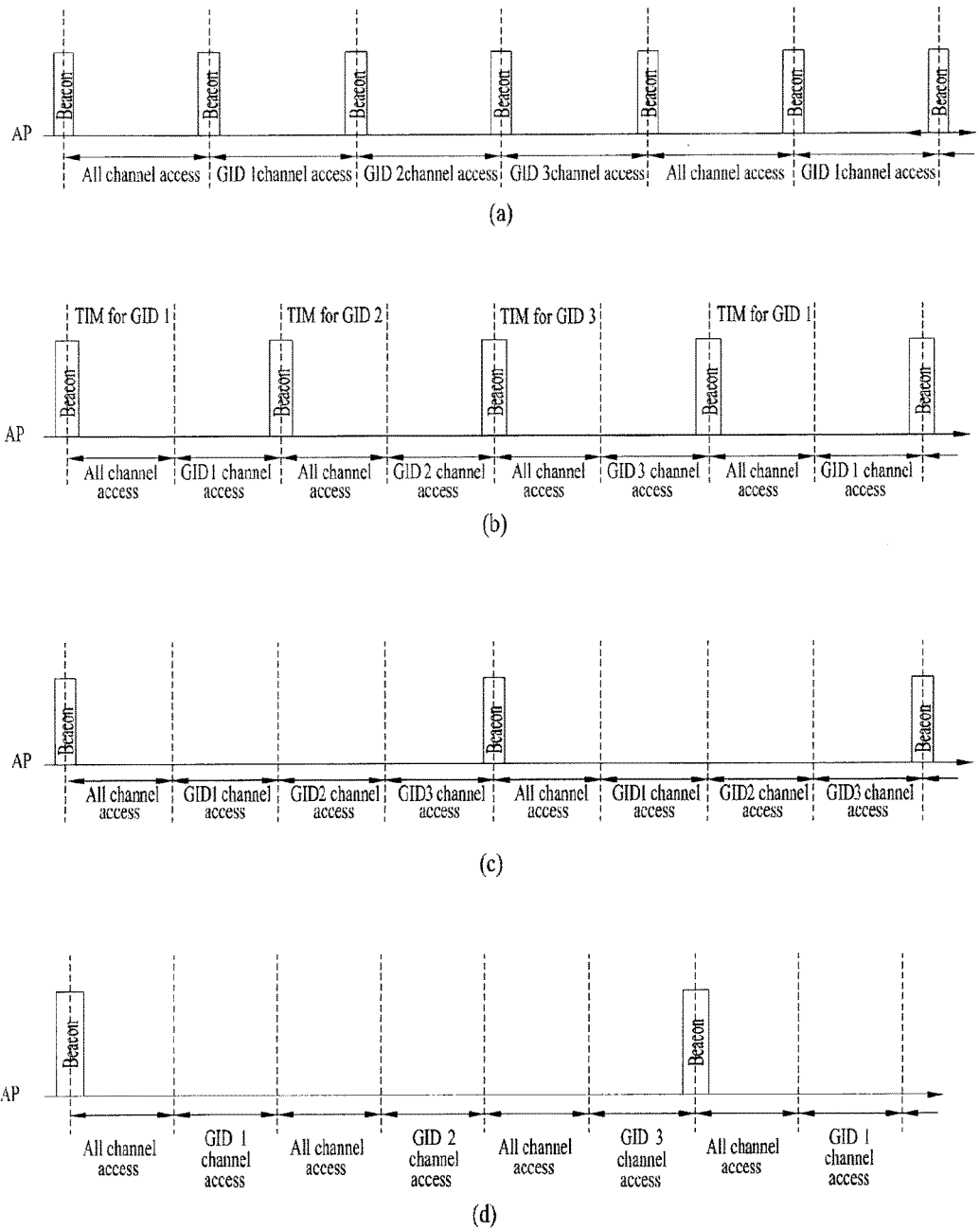
FIG. 16 is a conceptual diagram illustrating group-based channel access.

FIG. 16 is a conceptual diagram illustrating group-based channel access.

As described above, when at least one group is configured based on AID and allows channel access during a time interval for each group, a specific time interval (i.e., a time interval of all channel access) in which channel access of all STAs can be established. Alternatively, during the time interval of all channel access, only STAs not associated with the AP may transmit the frame to the AP through channel access without restriction.

If a time interval in which channel access of the STA contained in a specific group is allowed as shown in FIG. 16(a) is established in units of a beacon interval, the specific beacon interval may be set to the all-channel-access interval.

Some time intervals contained in one beacon interval may be set to the all-channel-access time interval as shown in FIG. 16(b), and other some parts may be set to a channel-access-allowed time interval of the STA contained in a specific group.

The group-based channel access time interval shown in FIG. 16(c) may be established by dividing one beacon interval into several sections. For example, assuming AIDs are classified into three groups, one beacon interval may be divided into four time intervals. In this case, one of the four time intervals may be set to the all-channel-access time interval, and the remaining three time intervals may be assigned to individual groups, respectively.

An additional time interval may be established in one beacon interval as shown in FIG. 16(d). For example, assuming that AIDs are classified into three groups, one beacon interval may be divided into 6 time intervals. Three time intervals from among the 6 time intervals may be allocated to individual groups, respectively, and the remaining 3 intervals may be allocated to the all-channel-access time interval. Although FIG. 16(d) alternately shows the time interval allocated to each group and the all-channel-access time interval, the scope or spirit of the present invention is not limited thereto and can be applied to other examples without change.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 15 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 15(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

TXOP truncation in RAW

Figure 15:
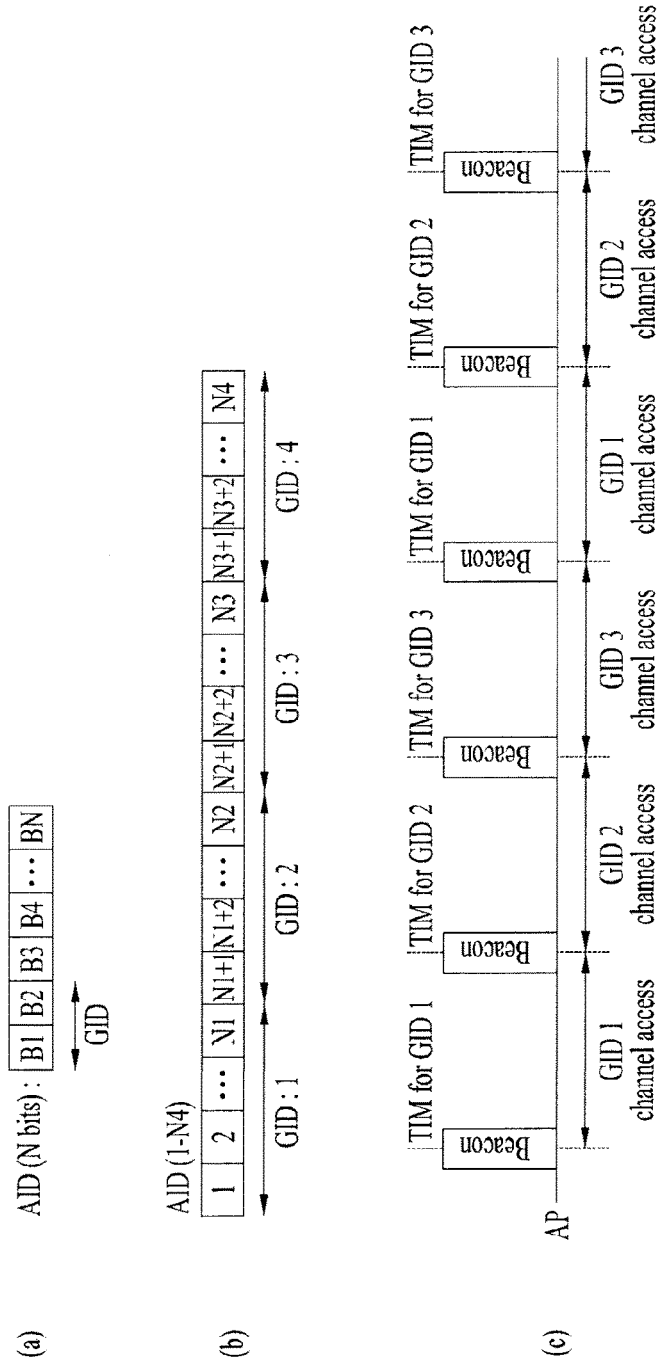
FIG. 15 is a conceptual diagram illustrating a group-based AID.

As shown in FIGS. 15 and 16, assuming that the channel access time interval is classified into a first time interval (e.g., RAW allocated to a specific group) in which only the STA contained in a specific group is restrictively allowed, and a second time interval (e.g., the all-channel-access time interval) in which use of all STAs or one STA not associated with the AP is allowed, channel access of the STA in which the use of the corresponding interval for each channel access time interval is allowed needs to be protected.

A specific time interval in which channel access for STAs contained in a specific group is restrictively allowed is referred to as a Restricted Access Window (RAW). Channel access for other STAs other than some STAs in which channel access for a specific RAW is allowed is not permitted. The other STA(s) must establish a Network Allocation Vector (NAV) for a specific time corresponding to the RAW. Accordingly, the other STA(s) may not attempt to perform channel access during a specific time corresponding to the RAW.

FIG. 17 is a conceptual diagram illustrating an exemplary format of a RAW parameter set information element (IE).

In FIG. 17, the Element ID field may be set to a specific value indicating that the corresponding information element (IE) is a RAQ parameter set (RPS) IE.

The Length field may be set to a specific value indicating the length of subsequent fields.

The GID field may be set to a specific value indicating STAs in which channel access is allowed for a time interval designated by the Restricted Access Window Start Offset and the Restricted Access Window Duration.

The Restricted Access Window Start Offset field may be set to a specific value indicating the start point of the RAW.

For example, the end time of the beacon frame may be set to the RAW time offset value.

The Restricted Access Window Duration field may be set to a specific value indicating the RAW duration.

The AP may transmit the RAW parameter set (RPS) IE to STAs through the beacon frame, etc. as shown in FIG. 17. Channel access for only some STAs (or contained in the corresponding GID) from among a plurality of STAs having received the RPS IE is allowed, and STAs (or not contained in the corresponding GID) not allocated to the corresponding RAW may establish the NAV during the RAW.

The STA in which channel access is allowed for the RAW time may attempt to perform channel access through the EDCA backoff. For example, if a channel is in an idle mode during the Arbitration Inter-Frame Space (AIFS) time, the STA performs carrier sensing during a specific time corresponding to the competition window. If the channel is in the idle mode, the STA can transmit the frame.

In this case, each of the control frame (for example, RTS, CTS or ACK frames, etc.), the DATA frame, the Management frame, etc. may include the Duration field. Other STA(s) but not the destination STA of the corresponding frame, from among a plurality of STAs having received the above frame may establish the NAV on the basis of the duration field value and then defer channel access. Through the above NAV configuration process, STAs contained in the hidden node may not attempt to perform channel access on the condition that the physical carrier sensing resultant channel (or medium) is in the idle state and the NAV is established, such that ongoing frame exchange is not interrupted.

Through the EDCA mechanism, the STA having successfully performed channel access through the EDCA mechanism can transmit one or more frames during the TXOP time. In this case, TXOP protection of the STA can be achieved through NAV configuration of other STA(s) through a value of the duration field contained in the transmission frame.

Generally, TXOP may establish the NAV during a predetermined time corresponding to the TXOP limit, irrespective of the actual transmission time of the UE. If frames to be transmitted are no longer present, the frame such as CF-END is transmitted such that other STAs can recognize the absence of the frames and can perform resetting of the NAV. NAV resetting of a certain STA may indicate that the corresponding STA can attempt to perform channel access (i.e., the corresponding STA may start contending for the medium without further delay).

After STAs allocated to a specific RAW performs channel access through the EDCA mechanism, the corresponding STAs can assume that the corresponding STAs transmit the CF-END frame to perform truncation of their TXOP. The CF-END frame is used when other STAs contained in the RAW recognize TXOP truncation of the STA serving as the TXOP holder and attempt to perform channel access. However, according to the conventional TXOP truncation mechanism, NAVs of all other STAs having received the CF-END frame are reset. That is, by the CF-END frame transmitted from a certain STA under the condition that a duration of the specific RAW is not terminated yet, NAVs of other STAs not allocated to the specific RAW can be reset. In this case, although the other STAs are not allocated to the specific RAW, channel access attempt may occur in the specific RAW because of the NAV reset.

In accordance with the embodiment, assuming that a predetermined time interval in which only channel access of specific STA(s) is restrictively allowed is established, TXOP truncation performed in the predetermined time interval may be performed only for the specific STA(s).

In the following examples of the present invention, the predetermined time interval is exemplarily denoted by 'RAW', and the TXOP truncation method of the present invention may be referred to as 'TXOP Truncation in RAW'. However, the scope or spirit of the present invention is not limited thereto, and the present invention can also be applied to a method for performing TXOP truncation within an arbitrary time interval in which only specific STA(s) perform(s) channel access through the EDCA mechanism.

In accordance with one example of 'TXOP Truncation in RAW' method of the present invention, after RAW is established, although STA(s) not contained in a group allocated to the RAW receive(s) the CF-END frame during the RAW section, the STA(s) may ignore or discard the received CF-END frame. The ignoring or discarding of the CF-END frame may indicate that NAV is not reset during the reception of the CF-END frame (i.e., a previously established NAV is maintained and channel access is not attempted.) In the meantime, STA(s) contained in the group allocated to the RAW may reset the NAV when receiving the CF-END frame during the RAW section (i.e., channel access can be attempted).

In accordance with the example of the present invention, the rule of the TXOP truncation operation can be simply implanted and the STA allocated to RAW can be protected. In the meantime, assuming that STAs allocated to RAW do not have a frame to be transmitted or a frame to be received any more, channel access of another STA is prohibited during the RAW section, such that a case in which no one uses a channel may occur. In this case, it is impossible to reduce a time section corresponding to RAW as well as to terminate the time interval corresponding to the RAW in early stages, system throughput can be deteriorated due to reduction of channel use efficiency.

In accordance with an additional example of 'TXOP Truncation in RAW' of the present invention, the present invention proposes a method for defining two different CF-END frames.

The first-type CF-END frame may be configured in such a manner that all STAs having received the corresponding CF-END frame can perform NAV resetting. That is, one STA allocated to RAW and another STA not allocated to the RAW are not distinguished from each other, and specific information indicating that all STAs having received the CF-END frame must perform NAV resetting may be contained in the corresponding CF-END frame.

The second-type CF-END frame may be referred to as the restricted CF-END frame (i.e., RCF-END frame). The RCF-END frame may allow only STAs contained in the specific group to perform NAV resetting during a specific time (such as RAW) in which channel access of only STAs contained in a specific group is allowed. Although other STA(s) not contained in the specific group receive the RCF-END frame, the other STA(s) may operate in a manner that NAV is not reset. Specific information indicating that only STAs of a specific group must perform NAV resetting may be contained in the corresponding CF-END frame (i.e., RCF-END frame).

Figure 18:
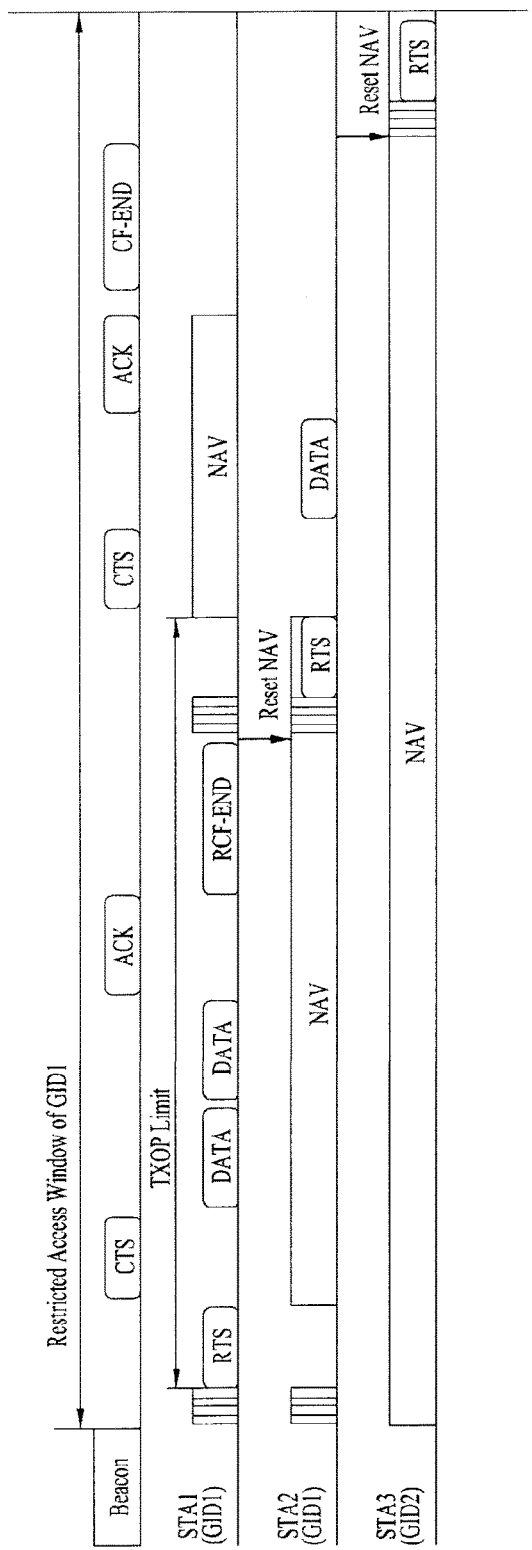
FIG. 18 is a conceptual diagram illustrating a TXOP truncation scheme according to one embodiment of the present invention.

FIG. 18 is a conceptual diagram illustrating a TXOP truncation scheme according to one embodiment of the present invention.

In FIG. 18, it is assumed that the AP establishes RAW for GID1 through the beacon frame. STA1 and STA2 contained in the GID1 group may transmit a frame after completion of a backoff operation through the EDCA mechanism during the RAW time of the GID1. STA3 not contained in the GID1 group may defer the channel access by establishing the NAV during the GID1 RAW time. That is, the NAV value allocated to STA3 may correspond to a time length of the RAW.

It is assumed that STA1 from among the STA1 and STA2 first obtains TXOP through the EDCA mechanism. Accordingly, STA1 may perform RTS transmission and CTS reception, and STA2 may establish the NAV through the duration field contained in the RTS/CTS frame. NAV established by STA2 may correspond to TXOP limit.

STA1 can transmit a data frame to the A and receive the ACK frame from the AP. If a frame to be transmitted is not present any more, the STA1 can transmit the RCF-END frame (for example, the second-type CF-END frame shown in the example of the present invention). STA2 having received the RCF-END frame may perform NAV resetting. That is, the NAV value originally established in the STA2 may correspond to TXOP limit, and a specific value is re-established to perform NAV truncation at the reception end time of the RCF-END frame.

While STA3 receives the RCF-END frame from STA1, STA3 may not perform NAV resetting. That is, the STA having received the RCF-END frame may perform NAV resetting only in a specific condition (for example, only the restricted STAs for use in a specific time interval in which only channel access of the restricted STAs is allowed can perform NAV resetting.

STA2 associated with NAV resetting may obtain TXOP through the EDCA mechanism, perform CTS reception of RTS transmission, and transmit a data frame. In accordance with RTS transmission and CTS reception of the STA2, NAV of the STA1 may be established. STA2 may transmit a data frame to the AP, and may receive the ACK frame from the AP. Subsequently, the AP transmits the CF-END frame to perform RAW truncation. The CF-END frame transmitted from the AP may not discriminate between a specific GID and an STA allocated to a specific RAW, and is destined for all STAs (for example, the first-type CF-END frame shown in the above example of the present invention). Accordingly, all STAs having received the CF-END frame from the AP may perform NAV resetting.

The CF-END frame (for example, the first-type CF-END frame or the second-type CF-End frame (or RCF-END frame)) for triggering different operations may be identified by allocating different values to the frame-type field or the sub-type field of the frame control (FC) field. Alternatively, although the same frame formats are used, a specific frame (for example, duration field) unused in the CF-END frame may be reused or re-defined in such a manner that the CF-END frame for triggering different operations can be discriminated.

For example, the STA configured to transmit the CF-END frame may allocate a zero '0' or a non-zero value to the duration field of the CF-END frame. In order to allow all STAs having received the CF-END frame to perform NAV resetting (i.e., in order to indicate the first-type CF-END frame), the duration field of the CF-END frame may be set to zero. On the contrary, the duration field of the CF-END frame may be set to the non-zero value in such a manner that STAs (for example, STAs in which channel access is allowed in the corresponding RAW) configured to satisfy a specific condition performs NAV resetting and other STAs not satisfying the specific condition may not perform NAV resetting (i.e., in order to indicate the second-type CF-END frame), the duration field of the CF-END frame may be set to the non-zero value.

The STA having received the CF-END frame can be defined as follows. All STAs having received the CF-END frame including the duration field of 0 may perform NAV resetting. On the contrary, the STA having received the CF-END frame including the duration field allocated to the non-zero value may perform NAV resetting when a specific condition is satisfied. If the STA having received the CF-END frame including the duration field allocated to the non-zero value does not satisfy the specific condition, the corresponding STA may not perform NAV resetting and the received CF-END frame may be ignored or discarded.

In accordance with the additional proposal of the present invention, when the duration field of the CF-END frame is set to the non-zero value, the duration field may be set to a non-zero value corresponding to the NAV value to be reset, instead of allocating an arbitrary non-zero value to the duration field. In this case, the STA having received the CF-END frame may reduce the NAV value when a value of the duration field of the CF-END frame is equal to or less than the NAV value currently allocated to the STA (i.e., NAV is reset). On the contrary, if the value of the duration field of the CF-END frame received by the STA is higher than the NAV value, the NAV value is not reduced (i.e., NAV is not reset). That is, the specific condition for use in the CF-END frame (or the RCF-END frame shown in the above example) in which only the STA satisfying a specific condition performs NAV resetting may indicate that a value designated by the duration field is equal to or less than the NAV value allocated to the STA having received the CF-END frame.

The duration field of the CF-END frame (or RCF-END frame) shown in FIG. 18 may be set to a specific value indicating the residual time of TXOP initiated by STA1. That is, since the duration field of the CF-END frame transmitted from STA1 is equal to or less than the NAV value allocated to STA2, STA2 may perform NAV resetting. On the contrary, the NAV value allocated to STA3 may correspond to a time length of the RAW section. Accordingly, STA3 having received the CF-END frame from STA1 may not perform NAV resetting because the value of the duration field of the CF-END frame is higher than the NAV value of the STA3. If the STA3 receives the CF-END frame (i.e., the CF-END frame in which the duration field value is set to zero) from the AP, the STA3 performs NAV resetting.

In addition, according to the additional proposal of the present invention, in accordance with the example in which the duration field of the CF-END frame is set to a non-zero value, the duration field may be set to a non-zero value corresponding to a NAV value to be reset, instead of allocating an arbitrary non-zero value to the duration field. Here, the STA having received the CF-END frame compares the value of the duration field of the CF-END frame with a current NAV value allocated to the STA. If the two values are identical to each other, the NAV value is reduced (i.e., NAV is reset). On the contrary, if the value of the duration field of the CF-END frame received by the STA is different from the NAV value, the NAV value is not reduced (i.e., NAV is not reset). That is, the specific condition for use in the CF-END frame (or the RCF-END frame shown in the above example) in which only the STA satisfying a specific condition performs NAV resetting may indicate that a value designated by the duration field is equal to the NAV value allocated to the STA having received the CF-END frame.

The duration field of the CF-END frame (or RCF-END frame) transmitted from STA1 shown in FIG. 18 may be set to a specific value indicating the residual time of TXOP initiated by STA1. That is, the value of the duration field of the CF-END frame transmitted from STA1 is identical to the NAV value allocated to STA2. Accordingly, STA2 having received the CF-END frame transmitted by the STA1 compares the value of the duration field of the CF-END frame with the NAV value of the STA2, and the two values are identical to each other, such that the NAV value of the STA2 can be reset. On the contrary, the NAV value allocated to the STA3 may correspond to the time length of the RAW section. Accordingly, the STA3 having received the CF-END frame transmitted from the STA1 compares the value of the duration field of the CF-END frame with the NAV value of the STA1. Here, the two values are different from each other, the STA3 may not reset its own NAV. If the STA3 receives the CF-END frame (i.e., the CF-END frame in which zero is allocated to the duration field) from the AP, the STA3 perform NAV resetting.

In this case, when determining whether the NAV resetting of the STA is performed by comparing the current NAV value with the value of the duration field of the CF-END frame, accuracy of the Timing Synchronization Function (TSF) of the STA needs to be considered. For example, if the duration field of the CF-END frame indicates 50 ms (or 50,000 μs), this means that the corresponding frame is terminated and NAV must be reset after lapse of 50 ms. In the case of using the STA in which a normal NAV is configured on the basis of the value of the duration field contained in the frame transmitted from the TXOP holder, TSF of the TXOP holder and the STA TSF may have timer errors. In this case, although the STA1 shown in FIG. 9 allocates a specific value indicating the TXOP residual time to the duration field of the CF-END frame, this value may be different from a current NAV value of the STA2 (i.e., although it is assumed that the NAV value decided by STA2 is identical to a specific value indicating the TXOP residual time according to the original intention of STA1, TSF errors may occur in the STA1 and the STA2, such that two values may be different from each other). As described above, since there may arise errors according to the TSF timer accuracy, difference values (i.e., +/−delta) within a predetermined range must be considered to be the same value, such that the resultant value can be more appropriately used for original TXOP truncation and channel access of another STA contained in RAW. Here, NAV is calculated/decided in units of a microsecond, and delta may be set to a natural number (e.g., several microseconds) considering the TSF timer errors.

Accordingly, assuming that a non-zero value of the duration field of the CF-END frame received by a certain STA is identical to any value of a predetermined range (e.g., 'NAV value−delta' to 'NAV value+delta') on the basis of the STA NAV value, the NAV is reset and medium competition can be started (or channel access can be attempted). On the contrary, assuming that a non-zero value of the duration field of the CF-END frame received by a certain STA is different from any value of a predetermined range (e.g., 'NAV value−delta' to 'NAV value+delta') on the basis of the STA NAV value, NAV is not reset and the CF-END frame may be ignored or discarded.

Figure 19:
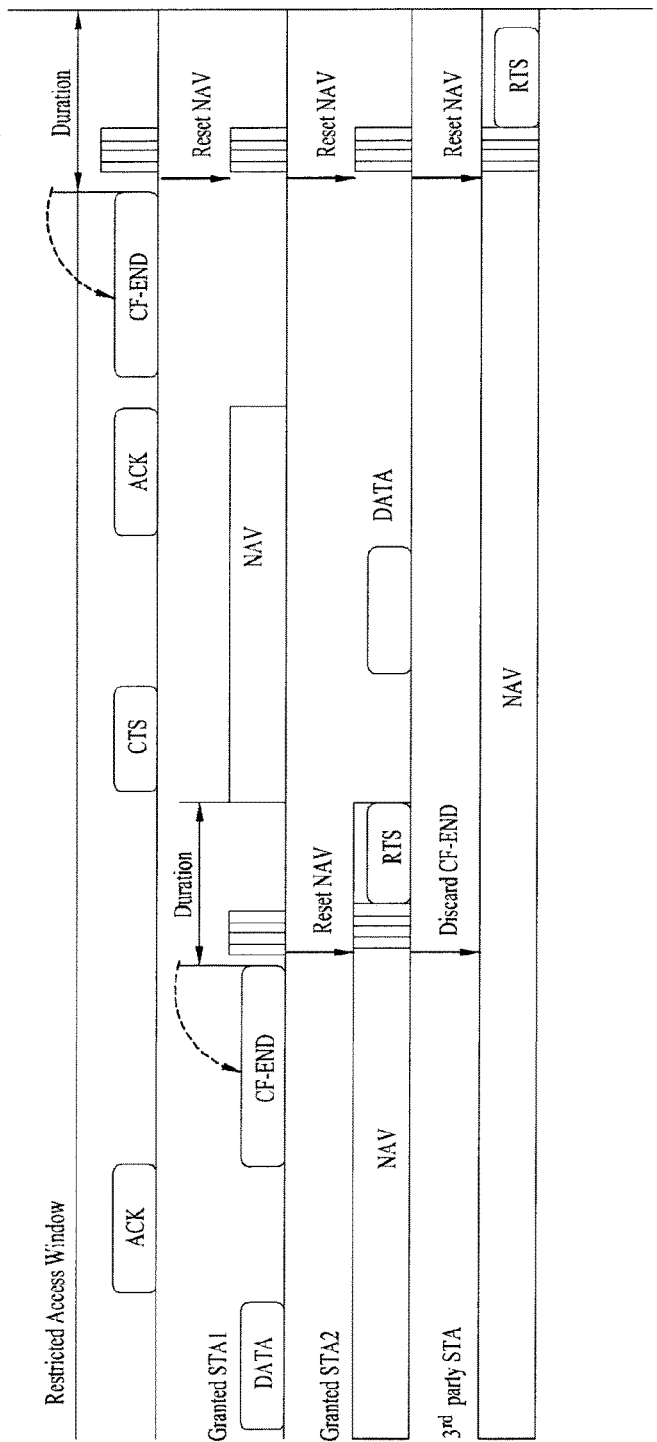
FIG. 19 is a conceptual diagram illustrating a TXOP truncation scheme according to another embodiment of the present invention.

FIG. 19 is a conceptual diagram illustrating a TXOP truncation scheme according to another embodiment of the present invention.

In FIG. 19, it is assumed that RAW is established, STA1 and STA2 may grant channel access to the RAW, and there is a third-party STA in which channel access of the RAW is not granted.

After Granted STA1 (i.e., TXOP holder) having obtained the TXOP in RAW transmit DATA frame(s) and receives the ACK frame from the AP, assuming that a frame to be transmitted is no longer present, the Granted STA1 can transmit the CF-END frame. Here, the duration field of the CF-END frame transmitted from the Granted STA1 may be set to the residual time value of the TXOP time interval decided by the STA1 from the viewpoint of the TXOP holder (for example, the TXOP time interval may be established through RTS transmission and CTS reception before transmission of the DATA frame). Granted STA2 having received the CF-END frame transmitted from STA1 may compare a value of the duration field of the CF-END frame with the NAV value thereof. If two values are identical to each other according to the comparison result (or if the value of the duration field is contained in the range of 'NAV value+/−delta'), STA2 may perform NAV resetting.

In association with third-party STAs in which channel access for RAW is not granted, NAV corresponding to the RAW section may be established through the beacon frame, etc. Accordingly, if the third-party STA receives the CF-END frame from the Granted STA1, it compares the value of the duration field of the CF-END frame with the NAV value thereof. If the two values are different from each other according to the comparison result (or if the value of the duration field is not contained in the range of 'NAV value+/−delta'), the third-party STA may not reset the NAV and may discard the CF-END frame.

If the Granted STA2, that confirms the duration field value of the CF-END frame transmitted from the Granted STA1 and performs NAV resetting, attempts to perform channel access (for example, through a backoff), the Granted STA2 transmits the RTS, receives the CTS, and transmits the DATA frame to the AP. In response to transmission of the DATA frame, STA2 may receive the ACK frame from the AP. Thereafter, the AP may transmit the CF-END frame so as to terminate the RAW.

Here, the duration field of the CF-END frame transmitted from the AP may be set to a specific value corresponding to the length of the residual RAW section. If the third-party STA receives the CF-END frame from the AP, the value of the duration field of the CF-END frame may be compared with the NAV value of the third-party STA. If two values are identical to each other according to the comparison result (or if the value of the duration field is not contained in the range of 'NAV value+/−delta'), the third-party STA may perform NAV resetting and attempt to perform channel access. Meanwhile, STA1 and STA2 may not attempt to perform channel access, because NAV is not established and no more data to be transmitted is present in the RAW section. Accordingly, although STA1 and STA2 receive the CF-END frame from the AP, the STA1 and the STA2 may ignore or discard the value of the duration field because the value of the duration field is different from the NAV value.

Alternatively, the duration field of the CF-END frame received from the AP may be assigned zero, and all STAs (for example, STA1, STA2, and third-party STA) having received the duration field value may perform NAV resetting.

Figure 20:
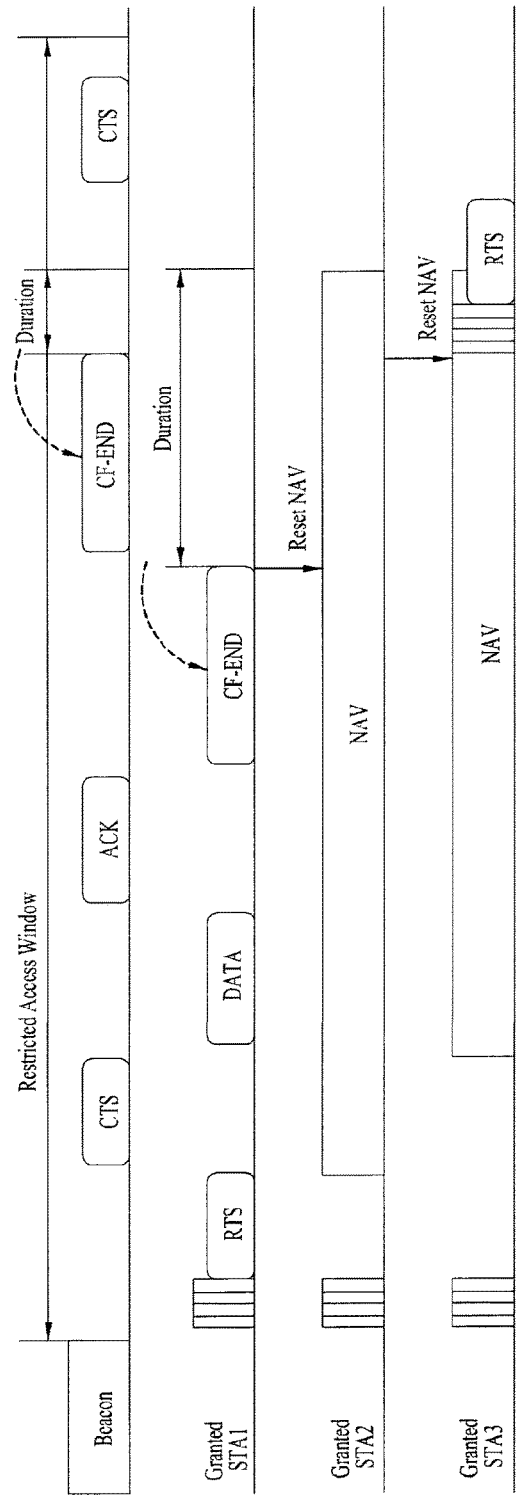
FIG. 20 is a conceptual diagram illustrating a TXOP truncation scheme according to another embodiment of the present invention.

FIG. 20 is a conceptual diagram illustrating a TXOP truncation scheme according to another embodiment of the present invention.

A hidden node situation may frequently occur in response to the increasing coverage provided by WLAN (for example, a WLAN system for providing 1 km or longer). Under the hidden node situation, another STA (i.e., STA staying in the relationship of a hidden node related to the TXOP holder) may not listen to the CF-END frame transmitted from the TXOP holder. Therefore, even when TXOP truncation occurs because the TXOP holder transmits the CF-END frame, some parts of other STAs do not recognize TXOP truncation, await truncation of currently established TXOP, and then defer their transmission. In order to solve the above-mentioned problem, the AP having received the CF-END frame from the TXOP holder broadcasts the corresponding CF-END frame once more, and the AP may inform other STAs that do not listen to the CF-END frame of TXOP truncation. It may be possible to inform other STAs which do not listen to the CF-END frame received from the TXOP holder, of TXOP truncation. Accordingly, the STA serving as a hidden node related to the TXOP holder may perform NAV resetting and attempt to perform channel access.

In FIG. 20, it is assumed that RAW is established, STA1, STA2, and STA3 are configured to grant channel access in the above RAW. Here, it is assumed that Granted STA1 operates as a hidden node of Granted STA3 and the Granted STA3 operates a hidden node of the Granted STA1. Accordingly, STA2 listens to the RTS frame received from STA1 and establishes the NAV according to the duration value, whereas STA3 listens to the CTS frame of the AP and establishes the NAV according to the duration value.

After Granted STA1 (i.e., TXOP holder) having obtained the TXOP in RAW transmit DATA frame(s) and receives the ACK frame from the AP, assuming that a frame to be transmitted is no longer present, the Granted STA1 can transmit the CF-END frame. Here, the duration field of the CF-END frame transmitted from the Granted STA1 may be set to the residual time value of the TXOP time interval decided by the STA1 from the viewpoint of the TXOP holder (for example, the TXOP time interval may be established through RTS transmission and CTS reception before transmission of the DATA frame). Granted STA2 having received the CF-END frame transmitted from STA1 may compare a value of the duration field of the CF-END frame with the NAV value thereof. If two values are identical to each other according to the comparison result (or if the value of the duration field is contained in the range of 'NAV value+/−delta'), STA2 may perform NAV resetting.

Since the Granted STA3 operates as a hidden node of Granted STA1, the Granted STA3 may not receive the CF-END frame from the Granted STA1. Meanwhile, the AP having received the CF-END frame from the Granted STA1 may broadcast the corresponding CF-END frame. Accordingly, the Granted STA3 may receive the CF-END frame broadcast by the AP.

Here, the duration field of the CF-END frame broadcast by the Ap may be set to a specific value indicating the same timing as that of the duration field of the CF-END frame received from the STA1. Since a transmission start time of the CF-END frame of the STA1 is different from that of the CF-END frame, individual duration fields may be set to the same value. In other words, assuming that the residual time value from among the TXOP time interval established by the STA1 serving as the TXOP holder is denoted by 'A' (for example, the TXOP time interval is established by RTS transmission and CTS reception before transmission of the DATA frame), the duration field of the CF-END frame transmitted by the STA1 is set to A. Meanwhile, the duration field of the CF-END frame broadcast by the AP may be set to the value of 'A−TxTime(CF-END)−SIFS'. Here, TxTime (CF-END) may correspond to a time length consumed for transmission of the CF-END frame.

Granted STA3 configured to receive the CF-END frame from the AP may compare a value of the duration field of the CF-END frame with the NAV value thereof. If the two values are identical to each other according to the comparison result (or if the value of the duration field is contained in the range of 'NAV value+/−delta'), STA3 may perform NAV resetting. Accordingly, the STA3 may attempt to perform channel access.

Figure 21:
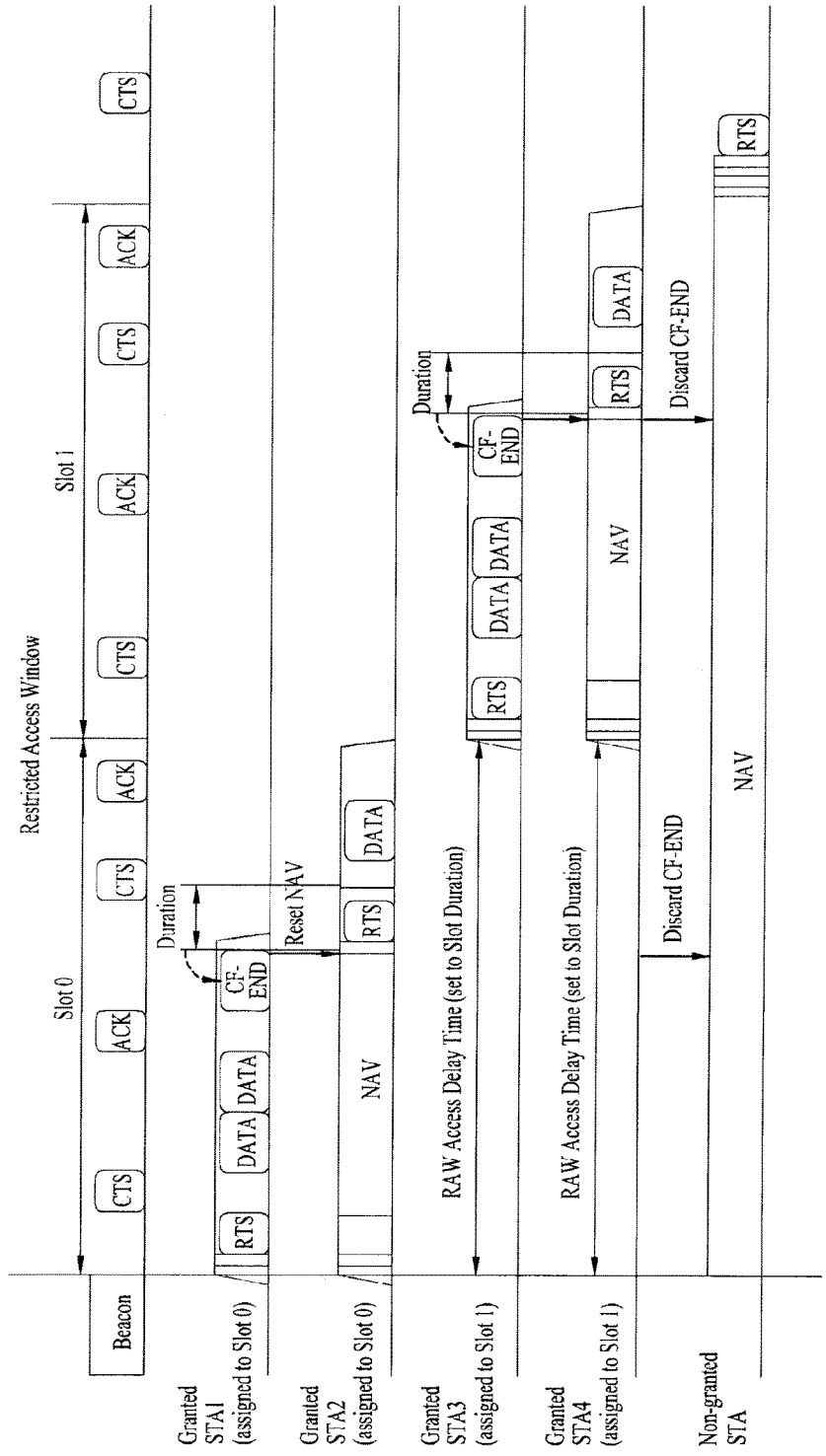
FIG. 21 is a conceptual diagram illustrating a TXOP truncation scheme according to another embodiment of the present invention.

FIG. 21 is a conceptual diagram illustrating a TXOP truncation scheme according to another embodiment of the present invention.

FIG. 21 exemplarily shows that one RAW is contained in a plurality of slots (Slot0, Slot1, . . . ). It is assumed that multiple slots contained in one RAW have the same time length.

STA1, STA2, STA3 and STA4 are configured to grant channel access in RAW, Granted STA1 and Granted STA2 are allocated to Slot0, and Granted STA3 and Granted STA4 are allocated to Slot1. Therefore, STA1 and STA2 may attempt to perform channel access at Slot0, and STA3 and STA4 must attempt to perform channel access at Slot1. For this purpose, a specific time corresponding to a slot duration may be allocated to the RAW Access Delay Time value for STA3 and STA4. Accordingly, STA3 and STA4 may attempt to perform channel access after lapse of the RAW Access Delay time. In addition, it is assumed that STA3 and STA4 are in a doze state during the RAW Access Delay Time so as to achieve power saving. In addition, it is assumed that there is an STA (Non-Granted STA) in which channel access is not granted in RAW.

In FIG. 21, it is assumed that STA1 and STA2 attempt to perform channel access at Slot0, a backoff operation is performed according to the EDCA mechanism, and STA1 is configured to first obtain the TXOP.

After Granted STA1 (i.e., TXOP holder) having obtained the TXOP in RAW transmit DATA frame(s) and receives the ACK frame from the AP, assuming that a frame to be transmitted is no longer present, the Granted STA1 can transmit the CF-END frame. Here, the duration field of the CF-END frame transmitted from the Granted STA1 may be set to the residual time value of the TXOP time interval decided by the STA1 from the viewpoint of the TXOP holder (for example, the TXOP time interval may be established through RTS transmission and CTS reception before transmission of the DATA frame). Granted STA2 having received the CF-END frame transmitted from STA1 may compare a value of the duration field of the CF-END frame with the NAV value thereof. If two values are identical to each other according to the comparison result (or if the value of the duration field is contained in the range of 'NAV value+/−delta'), STA2 may perform NAV resetting.

STA2 attempts to perform channel access after completion of NAV resetting (for example, the STA2 performs RTS frame transmission and CTS frame reception after completion of backoff), transmits the DATA frame to the AP, and receives the ACK frame from the AP.

In the meantime, although Non-Granted STA receives the CF-END frame from the STA1 at Slot0, the Non-Granted STA may not perform NAV resetting. If the Non-Granted STA receives the CF-END frame from the Granted STA1, the Non-Granted STA may compare the value of the duration field of the CF-END frame with a NAV value thereof. If the two values are different from each other according to the comparison result (or if the value of the duration field is not contained in the range of 'NAV value+/−delta'), the Non-Granted STA may not perform NAV resetting and may discard the CF-END frame. The NAV value established by the non-granted STA is not updated by a frame transmitted from another STA or AP in RAW, and is different from the duration value of the CF-END frame, so that the non-granted STA may not perform NAV resetting and may discard the CF-END frame. Alternatively, the CF-END frame received by the non-granted STA is not identical to the CF-END frame (for example, the CF-END frame including the duration field of zero) indicating NAV resetting of all STAs.

In FIG. 21, STA3 and STA4 may attempt to perform channel access at Slot1 after lapse of the RAW Access Delay Time, and the STA3 performs a backoff operation according to the EDCA mechanism so that the STA3 first obtains TXOP.

Slot1 STA3 and STA4 operations of the RAW are similar to Slot0 STA1 and STA2 operations. For example, the STA3 having first obtained TXOP may transmit the CF-END frame after completion of data transmission. STA2 confirms the value of the duration field of the CF-END frame transmitted from STA1. If the confirmed value is identical to the NAV value of the STA2, the STA2 may perform NAV resetting and may attempt to perform channel access.

STA1 and STA2 are in the doze state during the Slot1 time so as to achieve power saving.

Meanwhile, although the non-granted STA receives the CF-END frame from the STA3 during the slot1 time, NAV may be reset and the CF-END frame may be discarded. The NAV value established by the non-granted STA is not updated by a frame transmitted by another STA or AP in RAW, and is different from the duration value of the CF-END frame, so that the non-granted STA may not perform NAV resetting and may discard the CF-END frame. Alternatively, the CF-END frame received by the non-granted STA is not identical to the CF-END frame (for example, the CF-END frame including the duration field of zero) indicating NAV resetting of all STAs.

Figure 22:
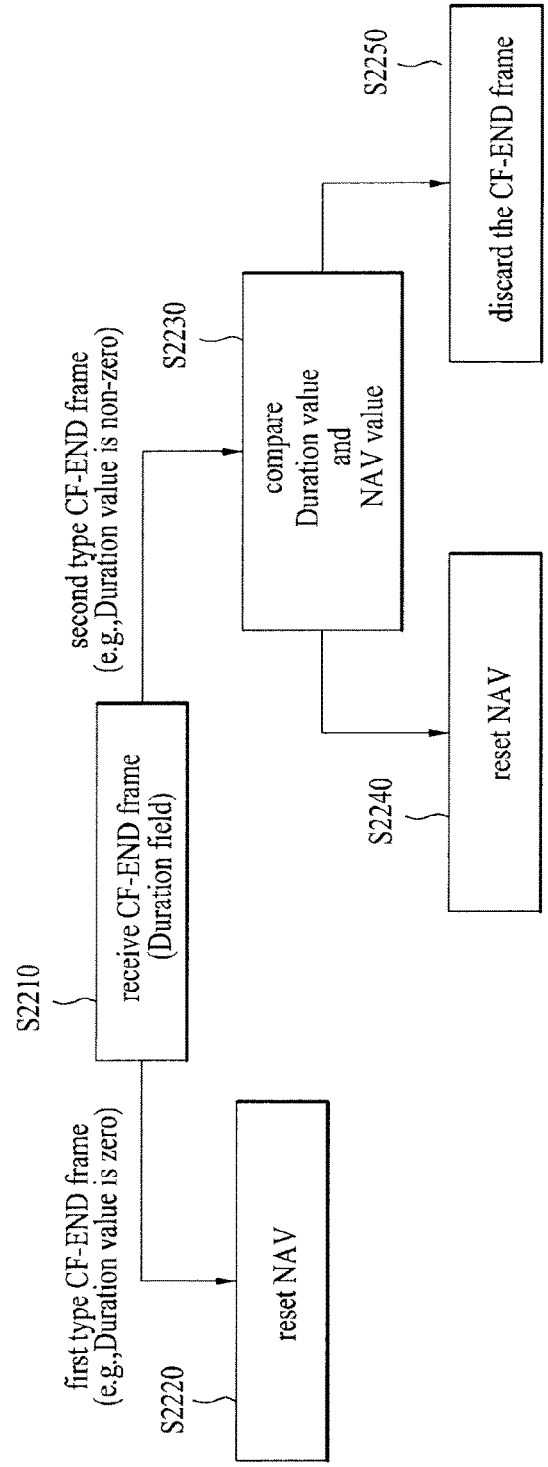
FIG. 22 is a flowchart illustrating a NAV management method according to one example of the present invention.

FIG. 22 is a flowchart illustrating a NAV management method according to one example of the present invention.

Referring to FIG. 22, the STA may receive the CF-END frame from another STA or AP in step S2210. The CF-END frame may include the duration field. From the standpoint of STA or AP configured to transmit the CF-END frame, zero or non-zero value may be assigned to the duration field of the CF-END frame.

Upon receiving the CF-END frame obtained when the duration field is set to zero, the STA may be based upon reception of the first-type CF-END frame. In other words, NAV may be reset in step S2220 (i.e., the STA does not compare the NAV value thereof with the duration field value).

Upon receiving the CF-END frame obtained when the duration field is set to a non-zero value, the STA may be based upon reception of the second-type CF-END frame. That is, according to the comparison result obtained when the duration field value of the CF-END frame is compared with the NAV value as shown in step S2230, it is determined whether to perform NAV resetting.

Assuming that the STA performs NAV resetting in step S2240, the duration field value is identical to the STA NAV value (or, the duration field value is identical to any value of a predetermined range (e.g., 'NAV value−delta' to 'NAV value+delta') on the basis of the STA NAV value in consideration of TSF errors). In this case, STA may reset the NAV and may attempt to perform channel access.

If the CF-END frame received by the STA is discarded in step S2250, and if the duration field value is different from the STA NAV value (or, the duration field value is different from any value of a predetermined range (e.g., 'NAV value−delta' to 'NAV value+delta') on the basis of the STA NAV value in consideration of TSF errors). In this case, the STA may maintain the conventional NAV value without change.

The NAV management method and associated channel access method shown in FIG. 22 may be implemented such that the above described various embodiments of the present invention may be independently applied or two or more embodiments thereof may be simultaneously applied.

Figure 23:
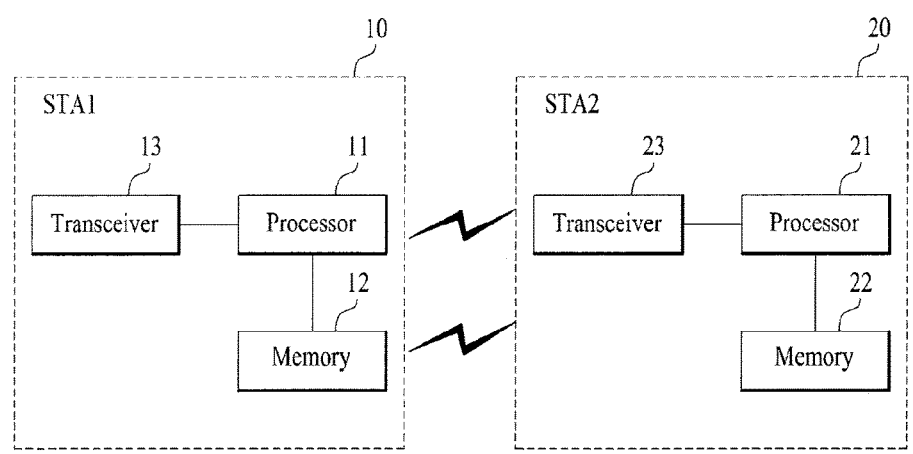
FIG. 23 is a block diagram illustrating a radio frequency (RF) device according to one embodiment of the present invention.

FIG. 23 is a block diagram illustrating a radio frequency (RF) device according to one embodiment of the present invention.

Referring to FIG. 23, an STA1 10 may include a processor 11, a memory 12, and a transceiver 13. An STA2 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above described various embodiments of the present invention. Modules for implementing operation of the STA1 and STA2 according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

STA1 10 shown in FIG. 23 may perform NAV management so as to perform channel access. The processor 11 may be configured to receive the CF-END frame including the duration field through the transceiver 13. In addition, if the received CF-END frame is set to a first-type CF-END frame (for example, the CF-END frame obtained when the duration field has zero), the processor 11 may be configured to reset the NAV. If the received CF-END frame is set to a second-type CF-END frame (for example, the CF-END frame obtained when the duration field has a non-zero value), the processor 11 may determine whether to perform NAV resetting according to the comparison result between the duration field value of the CF-END frame and the NAV value of the STA1 10.

STA2 20 shown in FIG. 23 may configure the CF-END frame and transmit the configured CF-END frame. If the STA2 20 capable of accessing a channel can empty its own transmission queue using an EDCA, and if the residual time interval is enough for frame transmission, the processor 21 controls the CF-END frame to be transmitted through the transceiver 23. In addition, the processor 21 may allocate zero (0) or a non-zero value to the duration field of the CF-END frame to be transmitted. STA2 20 may operate as the non-AP STA, or may operate as the AP STA.

The overall configuration of the STA1 10 and the STA2 20 shown in FIG. 23 may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

As is apparent from the above description, exemplary embodiments of the present invention can provide a new method for efficiently managing a network allocation vector (NAV) so as to increase channel access efficiency.

Although the above various embodiments of the present invention have been described based on an IEEE 802.11 system, the embodiments may be applied in the same manner to various mobile communication systems. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for managing a network allocation vector (NAV) by a station (STA) in a wireless LAN (WLAN) system, the method comprising:
    receiving a Contention Free (CF)-END frame including a duration field;
    when a value of duration field is equal to zero, resetting the NAV; and
    when the value of the duration field is not equal to zero, resetting the NAV when the non-zero value of the duration field is within a range from NAV value−delta to NAV value+delta, wherein delta is a natural number.

2. The method according to claim 1, wherein when the value of the duration field is not equal to zero, the STA discards the CF-END frame when the non-zero value is not within a predetermined range of values based on a NAV value of the STA.

3. The method according to claim 1, wherein:
    when the value of the duration field is not equal to zero and is identical to the NAV value of the STA, the STA resets the NAV and attempts to perform channel access.

4. The method according to claim 1, wherein:
    when the value of the duration field is not zero and is within the predetermined range of values based on the NAV value of the STA, the STA resets the NAV and attempts to perform channel access.

5. A station (STA) for managing a network allocation vector (NAV) in a wireless LAN (WLAN) system, the STA comprising:
    a transceiver; and
    a processor, wherein the processor receives a Contention Free (CF)-END frame including a duration field through the transceiver;

when a value of duration field is equal to zero, resets the NAV; and when the value of the duration field is not equal to zero, the processor resets the NAV when the non-zero value of the duration field is within a range from NAV value−delta to NAV value+delta, wherein delta is a natural number.

* * * * *